Nov. 25, 1941.   B. LEE   2,264,044

MOTOR VEHICLE SPEEDOMETER

Filed March 31, 1939

INVENTOR
Bert Lee
BY
ATTORNEY

Patented Nov. 25, 1941

2,264,044

UNITED STATES PATENT OFFICE 2,264,044

MOTOR VEHICLE SPEEDOMETER

Bert Lee, Sacramento, Calif.

Application March 31, 1939, Serial No. 265,234

5 Claims. (Cl. 116—57)

This invention relates generally to motor vehicle equipment and in particular the invention is directed to an improvement in speedometers for motor vehicles.

As arranged at present in motor vehicles, the speedometer is mounted behind the instrument panel and is read through a window in said panel. The driver of the motor vehicle must glance down to read the speedometer, and when so doing must look away from the highway ahead; a dangerous procedure especially when traveling at high speed.

It is therefore the principal object of my invention to provide a motor vehicle speedometer which is so arranged and mounted that the driver is apprised of the vehicle speed without the necessity of looking away from the highway ahead; the numerals representing the vehicle speed being projected as transparent images onto the windshield directly in front of the driver and by means of reflected light.

A further object of the invention is to produce a simple and inexpensive device and yet one which will be exceedingly effective for the purpose for which it is designed. These objects I accomplish by means of such structure and relative arrangement of parts as will fully appear by a perusal of the following specification and claims.

In the drawing similar characters of reference indicate corresponding parts in the several views.

Figure 1:
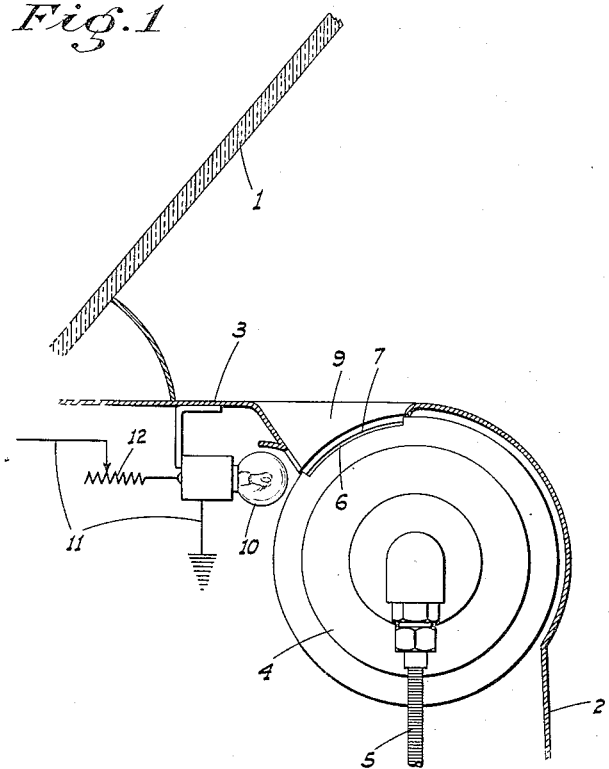
Figure 1 is a somewhat diagrammatic side elevation of the device as embodied in a motor vehicle.

Referring now more particularly to the characters of reference on the drawing, the numeral 1 indicates a motor vehicle windshield sloping rearwardly as is now customary; the substantially vertical instrument panel being shown at 2, and the substantially horizontal interior cowl portion being shown at 3.

A speedometer 4 is mounted directly beneath the cowl portion 3 and behind the instrument panel 2; this speedometer having the usual drive mechanism therein and driven from a flex cable 5 as is common practice. The speedometer includes a rotary circular dial 6 disposed with its axis horizontal and transversely of the vehicle; the dial including a circumferential face 7 which is flat transversely.

The face 7 of dial 6 is finished in a dead black, as shown, so as to reduce light reflection therefrom to a minimum, while the numerals 8 representing the vehicle speed are imprinted in circumferentially spaced relation and in reverse on such face with a suitable material and in suitable color—such as red—to reflect a maximum amount of light.

Figure 2:
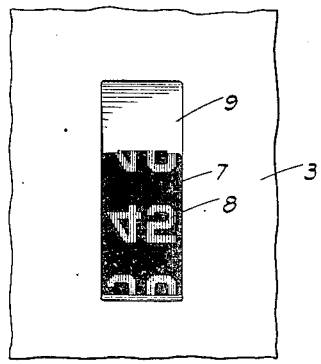
Figure 2 is a fragmentary plan view of the slotted cowl portion of the instrument panel and showing the speedometer dial therebeneath.

The interior cowl portion 3 is formed with a window 9 in register with the dial and in facing relation to the windshield 1; said window being substantially the same width as the dial face 7 and of a length to expose one numeral and a portion of both the numerals ahead of and the one following such exposed numeral, as shown in Fig. 2. The window 9 is of sufficient depth to form in effect a well and is so positioned that the bottom thereof faces the windshield; said bottom of this well being the exposed portion of the black face 7 of dial 6. An electric globe 10 is mounted under the cowl portion and in position to illuminate this exposed portion of the dial face which registers with window 9 or forms the bottom of such well; the circuit 11 for such globe having a manually controlled rheostat 12 interposed therein and for the purpose of controlling the intensity of the light cast on the dial.

Operation

Figure 3:
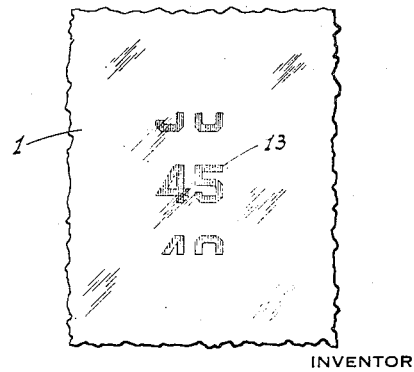
Figure 3 is a fragmentary view of the windshield from the inside and showing the images of the numerals as projected thereon.

In operation, the globe 10 is illuminated, brightly in daytime, and dimly at night-time, and the light therefrom as cast on the exposed numerals 8 is reflected in such manner as to produce transparent but easily readable images on the windshield and as shown at 13 in Fig. 3. As these images are on the windshield and through which the driver is watching the highway, the vehicle speed is made known to such driver without the necessity of looking down and away from the highway. As there is substantially no reflection from the dead black face of the dial, the numerals are reflected in bold outline on the windshield and without any background, as is desirable.

The usual mileage counting mechanism will be visible through an instrument panel window.

From the foregoing description it will be readily seen that I have produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claims.

Having thus described my invention, what I claim as new and useful and desire to secure by Letters Patent is:

1. In a motor vehicle, a windshield, a movable speed indicating element having light reflecting indicia thereon in reverse position, an interior cowl portion extending rearwardly from the windshield, means mounting the speed indicating element on the vehicle beneath said cowl portion, the cowl portion having an opening therein exposing a portion of said element, and means to illuminate said exposed portion of the speed indicating element, the latter facing the windshield at such an angle as to cause an image of the indicia on said portion of the element to be directly projected onto the windshield and reflected rearwardly therefrom in substantially the line of vision of the driver of the vehicle.

2. In a motor vehicle, a windshield, a driven dial, light reflecting speed indicia on said dial in reverse position, a cowl extending rearwardly from the windshield, means mounting the dial beneath said cowl, a well in said cowl exposing a portion of the dial and certain of the speed indicia thereon, the exposed portion of the dial forming the bottom of the well, and means to illuminate said exposed portion of the dial; said portion facing the windshield at such an angle as to cause an image of the exposed speed indicia to be directly projected onto the windshield and reflected rearwardly therefrom in substantially the line of vision of the driver of the vehicle.

3. In a motor vehicle, a rearwardly and upwardly sloping windshield, a driven speed indicating dial having light reflecting indicia thereon in reverse position; a cowl extending rearwardly from the windshield, a well formed in said cowl, the axis of said well sloping forwardly and upwardly, means mounting the dial beneath the cowl, a portion of the dial being exposed by the well and said portion forming the bottom of the well, and means to illuminate said exposed portion of the dial; the latter facing the windshield at such an angle as to cause an image of the indicia on said portion to be directly projected onto the windshield and reflected rearwardly therefrom in substantially the line of vision of the driver of the vehicle.

4. A device as in claim 3 in which said portion of the well is illuminated by a light source disposed under the cowl; the well having an opening therein through which the light passes to said dial portion from the light source.

5. In a motor vehicle, a rearwardly and upwardly sloping windshield, a cowl extending rearwardly from the windshield, a circumferential dial having a flat face transversely, light reflecting indicia thereon in reverse position, means mounting the dial beneath the cowl on an axis extending transversely of the vehicle, the cowl having an opening therein exposing and framing a portion of the dial face, and means to illuminate said portion; the latter facing upwardly and forwardly at such an angle as to the windshield to cause an image of the indicia on said portion to be directly projected onto the windshield and reflected rearwardly therefrom in substantially the line of vision of the driver of the vehicle.

BERT LEE.